United States Patent
Shigeta

(10) Patent No.: US 10,477,119 B2
(45) Date of Patent: Nov. 12, 2019

(54) IMAGING DEVICE

(71) Applicant: CANON KABUSHIKI KAISHA, Tokyo (JP)

(72) Inventor: Kazuyuki Shigeta, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1023 days.

(21) Appl. No.: 14/665,332

(22) Filed: Mar. 23, 2015

(65) Prior Publication Data
US 2015/0281600 A1  Oct. 1, 2015

(30) Foreign Application Priority Data

Mar. 25, 2014 (JP) ................. 2014-062729
Dec. 26, 2014 (JP) ................. 2014-265778

(51) Int. Cl.
| | |
|---|---|
| G06K 9/00 | (2006.01) |
| G06K 9/20 | (2006.01) |
| G06T 7/00 | (2017.01) |
| H04N 5/33 | (2006.01) |
| H04N 9/04 | (2006.01) |
| H04N 5/232 | (2006.01) |

(52) U.S. Cl.
CPC ......... *H04N 5/332* (2013.01); *G06K 9/00013* (2013.01); *G06K 9/2018* (2013.01); *G06T 7/0016* (2013.01); *H04N 5/23241* (2013.01); *H04N 9/045* (2013.01); *G06K 2009/00932* (2013.01); *G06T 2207/10016* (2013.01); *G06T 2207/10024* (2013.01); *G06T 2207/10048* (2013.01); *G06T 2207/30101* (2013.01)

(58) Field of Classification Search
USPC .......................................... 348/77
See application file for complete search history.

(56) References Cited

U.S. PATENT DOCUMENTS

| | | | |
|---|---|---|---|
| 5,598,145 A * | 1/1997 | Shimotani | A61B 3/145 180/272 |
| 2007/0201738 A1* | 8/2007 | Toda | H04N 9/045 382/144 |
| 2007/0272836 A1* | 11/2007 | Higashitsutsumi | G01J 3/36 250/226 |

(Continued)

FOREIGN PATENT DOCUMENTS

| | | |
|---|---|---|
| JP | H11-297973 | 10/1999 |
| JP | 2005-095606 | 4/2005 |

(Continued)

*Primary Examiner* — Christopher S Kelley
*Assistant Examiner* — Ana Picon-Feliciano
(74) *Attorney, Agent, or Firm* — Venable LLP

(57) ABSTRACT

An imaging device includes an image sensing unit having a plurality of pixels two-dimensionally arranged. The plurality of pixels include a first pixel and a second pixel. Light sensitivity of the first pixel has a local maximum value near a first wavelength and a local maximum value near a second wavelength. The first wavelength and the second wavelength are in a near-infrared wavelength band. Light sensitivity of the second pixel has a local maximum value near the second wavelength. The light sensitivity of the second pixel at the first wavelength is not higher than 10% of the light sensitivity of the first pixel at the first wavelength.

17 Claims, 18 Drawing Sheets

(56) References Cited

U.S. PATENT DOCUMENTS

| | | | | |
|---|---|---|---|---|
| 2014/0194748 A1* | 7/2014 | Yamamoto | ............ | A61B 5/0059 600/473 |
| 2014/0343383 A1* | 11/2014 | Sato | ................... | A61B 5/14552 600/324 |
| 2015/0221691 A1* | 8/2015 | Watanabe | .............. | H04N 5/332 348/164 |

FOREIGN PATENT DOCUMENTS

| | | |
|---|---|---|
| JP | 2009-009403 | 1/2009 |
| JP | 2009-257919 | 11/2009 |
| JP | 2011-147469 | 8/2011 |

* cited by examiner

| R | G | R | G |
|---|---|---|---|
| B | P2 | B | P2 |
| R | G | R | G |
| B | P2 | B | P2 |

LIGHT SENSITIVITY CHARACTERISTIC OF FIRST PIXELS P3

LIGHT SENSITIVITY CHARACTERISTIC OF SECOND PIXELS P2

RELATIONSHIP BETWEEN LIGHT SENSITIVITY CHARACTERISTIC
OF FIRST PIXELS P3 AND EACH LIGHT BEAM

RELATIONSHIP BETWEEN LIGHT SENSITIVITY CHARACTERISTIC
OF SECOND PIXELS P2 AND EACH LIGHT BEAM

IMAGING DEVICE

BACKGROUND OF THE INVENTION

Field of the Invention

The present invention relates to an imaging device.

Description of the Related Art

There is known a device which measures the oxygen saturation of blood, that is, the ratio of concentration of oxygenated hemoglobin to the sum of oxygenated hemoglobin and reduced hemoglobin by using a plurality of near-infrared light beams. A pulse oximeter and light topography are representative medical devices which use the oxygen saturation of blood.

Japanese Patent Laid-Open No. 2005-95606 discloses a pulse oximeter which obtains the oxygen saturation of arterial blood at high accuracy by removing the influence of body motion artifacts. This pulse oximeter receives five light beams of different wavelengths, and removes the influence of a variation in arterial blood and a variation in tissue based on a change amount of reflected light or transmitted light of each wavelength output from a light receiving unit.

Japanese Patent Laid-Open No. 11-297973 describes an infrared imaging device including a first light receiving unit for receiving mid-infrared light and a second light receiving unit for receiving far-infrared light.

The device described in Japanese Patent Laid-Open No. 2005-95606 cannot specify the positions of the first and second portions having different wavelength characteristics in an object including the first and second portions. In the device described in Japanese Patent Laid-Open No. 11-297973, the first and second light receiving units are stacked. Therefore, the wavelengths of light beams respectively received by the first and second light receiving units are required to be apart from each other like mid-infrared light and far-infrared light. It is thus difficult for the device described in Japanese Patent Laid-Open No. 11-297973 to accurately separate and detect the first and second portions each having a local maximum value of the absorbance in the near-infrared wavelength band.

SUMMARY OF THE INVENTION

The present invention provides an imaging device advantageous in identifying and inspecting the first and second portions having different wavelength characteristics in an object including the first and second portions in the near-infrared wavelength band.

One of aspects of the invention provides an imaging device including an image sensing unit having a plurality of pixels two-dimensionally arranged, wherein the plurality of pixels include a first pixel and a second pixel, light sensitivity of the first pixel has a local maximum value near a first wavelength and a local maximum value near a second wavelength, the first wavelength being different from the second wavelength in a near-infrared wavelength band, the first wavelength and the second wavelength being in a near-infrared wavelength band, light sensitivity of the second pixel has a local maximum value near the second wavelength, and the light sensitivity of the second pixel at the first wavelength is not higher than 10% of the light sensitivity of the first pixel at the first wavelength.

Further features of the present invention will become apparent from the following description of exemplary embodiments with reference to the attached drawings.

BRIEF DESCRIPTION OF THE DRAWINGS

FIG. 14 is a view schematically showing the imaging region of an image sensing unit incorporated in the imaging device;

DESCRIPTION OF THE EMBODIMENTS

The present invention will be described below using exemplary embodiments with reference to the accompanying drawings.

First Embodiment

Figure 1:
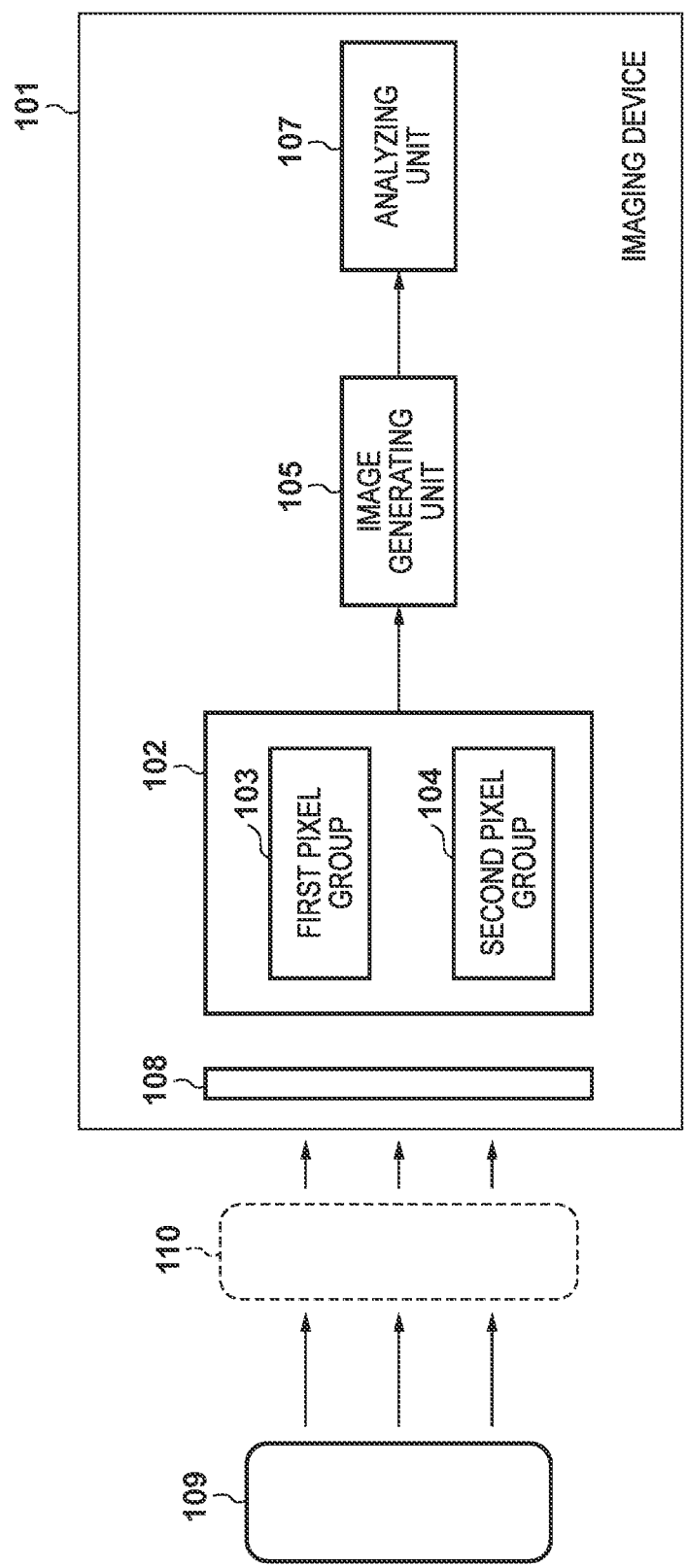
FIG. 1 is a block diagram showing the arrangement of an imaging device according to the first embodiment.

The arrangement of an imaging device 101 according to the first embodiment of the present invention will be described with reference to FIG. 1. The imaging device 101 includes an image sensing unit 102 in which a plurality of pixels are two-dimensionally arranged. The image sensing unit 102 can be a solid-state imaging device (image sensor). The image sensing unit 102 includes a first pixel group 103 and a second pixel group 104. The first pixel group 103 includes a plurality of first pixels P1 distributed and arranged in an imaging region. The second pixel group 104 includes a plurality of second pixels P2 distributed and arranged in the imaging region. The plurality of first pixels P1 has sensitivity to near-infrared light in the first wavelength band. The plurality of second pixels P2 has sensitivity to near-infrared light in the second wavelength band. The first and second wavelength bands are different from each other but at least part of the second wavelength band belongs to the first wavelength band. The light sensitivity of the first pixels P1 has local maximum values near the first and second wavelengths different from each other in the first wavelength band. The light sensitivity of the second pixels P2 has a local maximum value near the second wavelength.

Since the first and second wavelength bands are different from each other, both the first image obtained by using the plurality of first pixels P1 and the second image obtained by using the plurality of second pixels P2 can include information of the first and second portions of an object 110 having different wavelength characteristics. The first portion of the object 110 has a local maximum value of the absorbance (molecular extinction coefficient) at the first wavelength, and the second portion of the object 110 has a local maximum value of the absorbance at the second wavelength. The light sensitivities (light sensitivity characteristics) of the first pixels P1 and the second pixels P2 can be decided according to the absorbances (molecular extinction coefficients) of the first and second portions of the object 110 to be inspected. That is, the first pixels P1 are configured to have local maximum values of the light sensitivity near the first and second wavelengths so as to acquire information of the first and second portions. The second pixels P2 are configured to have a local maximum value near the second wavelength so as to acquire information of the second portion.

The imaging device 101 can include an image generating unit 105. The image generating unit 105 can be implemented by a computer such as a CPU, and a computer program that causes the computer to operate as the image generating unit 105. The image generating unit 105 can be configured to generate at least one of an image indicating the first portion and an image indicating the second portion based on the first and second images. The image generating unit 105 can generate a pixel signal indicating the first portion and a pixel signal indicating the second portion based on the ratio between the signal values of the first pixel P1 and the second pixel P2 which are adjacent to each other. The first image can be formed from the signals of the plurality of first pixels P1 and signals generated by interpolation or the like based on the signals. The second image can be formed from the signals of the plurality of second pixels P2 and signals generated by interpolation or the like based on the signals.

The imaging device 101 may also include an analyzing unit 107 which analyzes a temporal change of an image generated by the image generating unit 105. The analyzing unit 107 can be implemented by a computer such as a CPU, and a computer program that causes the computer to operate as the analyzing unit 107. In an example, the first portion represents an artery and the second portion represents a vein. The analyzing unit 107 can detect pulsation based on a temporal change of an image generated by the image generating unit 105.

The imaging device 101 may include an optical filter 108. The optical filter 108 removes background light. The optical filter 108 cuts off light of a wavelength shorter than the lower limit wavelength in the wavelength band including the first and second wavelength bands.

The imaging device 101 may include a light source 109. Alternatively, the imaging device 101 may be configured to be able to control the light source 109. The light source 109 may be configured to be operated or controlled independently of the imaging device 101. The light source 109 is configured to emit light having the near-infrared band, for example, light having the near-infrared band and visible wavelength band. Light (illumination light) emitted by the light source 109 is applied to the object (for example, part of a human or animal) 110, and is transmitted through the object 110 or reflected by the object 110 to enter the image sensing unit 102 of the imaging device 101.

Figure 2:
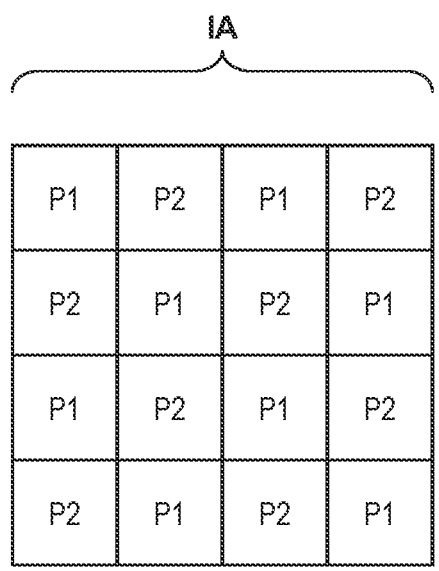
FIG. 2 is a view schematically showing the imaging region of an image sensing unit incorporated in the imaging device according to the first embodiment.

FIG. 2 schematically shows an imaging region IA of the image sensing unit 102. In the imaging region IA, the plurality of first pixels P1 forming the first pixel group 103 are distributed and arranged, and the plurality of second pixels P2 forming the second pixel group 104 are distributed and arranged. Note that in FIG. 2, the imaging region IA is formed by 4 pixels×4 pixels. In fact, more pixels are arranged. In the example shown in FIG. 2, the first pixels P1 and second pixels P2 are alternately arranged in the horizontal direction (row direction) and the vertical direction (column direction). However, another arrangement may be adopted.

Figure 3A:
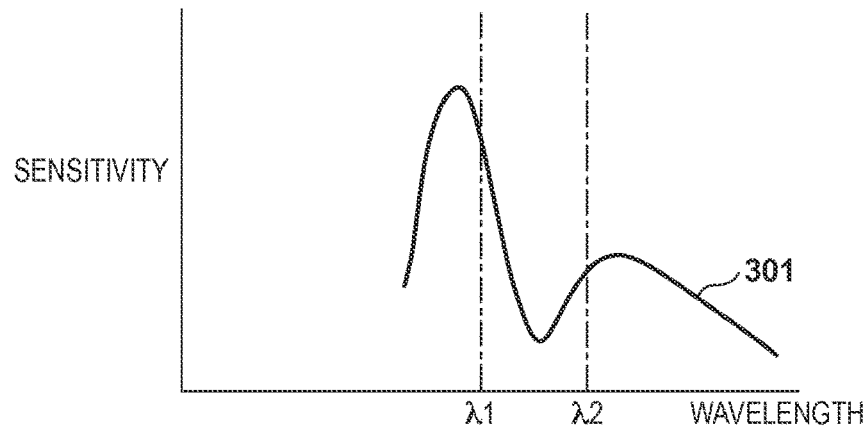
FIGS. 3A and 3B are graphs exemplifying the light sensitivity characteristics of the first and second pixels.
Figure 3B:
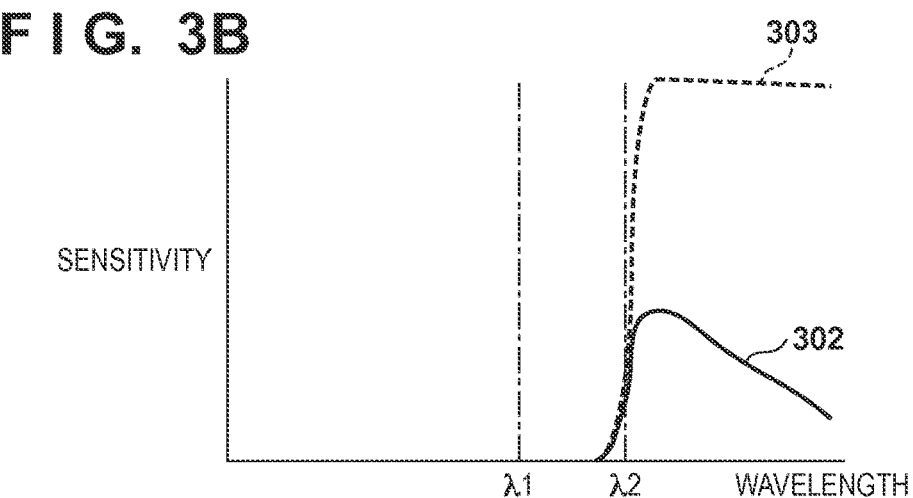

FIG. 3A exemplifies the light sensitivity characteristic of the first pixels P1. FIG. 3B exemplifies the light sensitivity characteristic of the second pixels P2. In FIGS. 3A and 3B, the abscissa represents the wavelength and the ordinate represents the sensitivity. A first wavelength $\lambda 1$ and a second wavelength $\lambda 2$ are different wavelengths in the near-infrared band. In an example, $\lambda 1 = 750$ nm and $\lambda 2 = 800$ nm. A light sensitivity curve 301 indicates the light sensitivity characteristic of the first pixels P1, a light sensitivity curve 302 indicates the light sensitivity characteristic of the second pixels P2. In this example, the light sensitivity curve 302 is a curve obtained by multiplying the light sensitivity curve 301 of the first pixels P1 by a light characteristic 303. The light characteristic 303 has a characteristic in which a wavelength equal to or shorter than a predetermined cutoff wavelength is cut off. The cutoff wavelength can be set within, for example, a range of 800 nm±30 nm (that is, the range from 770 nm (inclusive) to 830 nm (inclusive)). The light sensitivity curve 301 has local maximum values near the first wavelength $\lambda 1$ and the second wavelength $\lambda 2$. The light sensitivity curve 302 has a local maximum value near the second wavelength $\lambda 2$.

Figure 4:
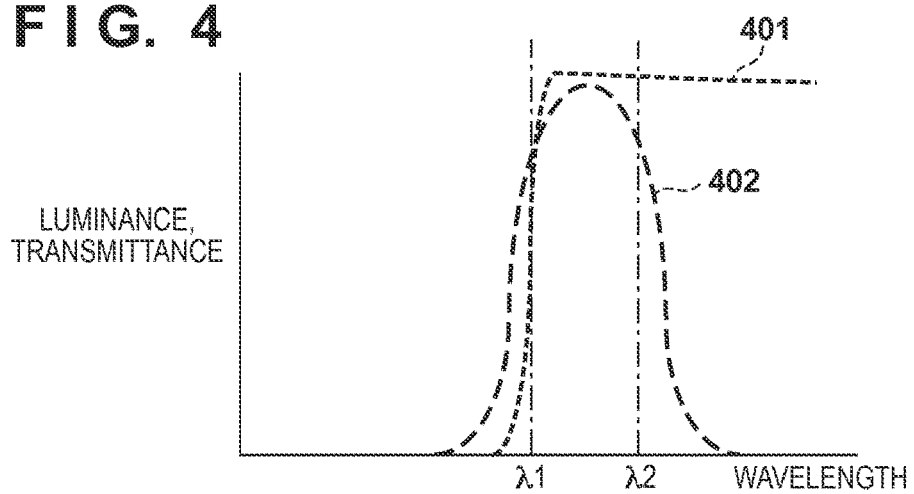
FIG. 4 is a graph exemplifying the filter characteristic of an optical filter and the wavelength characteristic of light from an object.

FIG. 4 exemplifies a filter characteristic 401 of the optical filter 108 and a wavelength characteristic 402 of light from the object 110. The light from the object 110 is light emitted by the light source 109 and transmitted through the object 110 or light emitted by the light source 109 and reflected by the object 110. In FIG. 4, the abscissa represents the wavelength and the ordinate represents the transmittance for the filter characteristic 401 and the luminance for the light from the object 110. The filter characteristic 401 of the optical filter 108 indicates a characteristic in which a wavelength shorter than the wavelength λ1 as a cutoff frequency is not transmitted. The light emitted by the light source 109 has a wavelength band including the wavelength λ1 and the wavelength λ2.

The imaging device 101 captures an image formed in the imaging region of the image sensing unit 102 by the light from the object 110, and identifies, for example, an artery and vein based on the obtained image to detect pulsation (a pulse rate).

The optical filter 108 removes a component having a wavelength shorter than the wavelength λ1 of the light from the object 110, and the resultant light enters the imaging region of the image sensing unit 102. The image sensing unit 102 outputs information including information of the first image obtained by capturing light in the first wavelength band by the plurality of first pixels P1 forming the first pixel group 103 and information of the second image obtained by capturing light in the first wavelength band by the plurality of second pixels P2 forming the second pixel group 104. The image sensing unit 102 may be configured to separately output the first and second images, or output an image obtained by combining the first and second images.

Figure 5A:
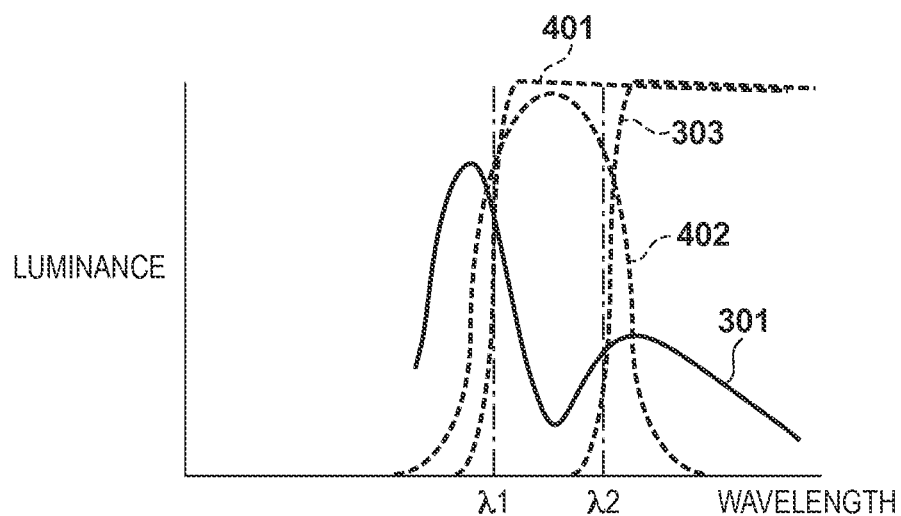
FIGS. 5A and 5B are graphs exemplifying a wavelength component of light detected by a plurality of first pixels forming the first pixel group and a wavelength component of light detected by a plurality of second pixels forming the second pixel group, respectively.

FIG. 5A exemplifies a wavelength component of the light detected by the plurality of first pixels P1 forming the first pixel group 103. In other words, FIG. 5A exemplifies a wavelength component of the light corresponding to the first image obtained by using the plurality of first pixels P1 forming the first pixel group 103. In FIG. 5A, the abscissa represents the wavelength and the ordinate represents the luminance of the light from the object 110. The plurality of first pixels P1 detect, as the first image, light corresponding to a product obtained by multiplying the wavelength characteristic 402 of the light from the object 110 by the filter characteristic 401 of the optical filter 108 and the light sensitivity curve 301 of the first pixels P1.

Figure 5B:
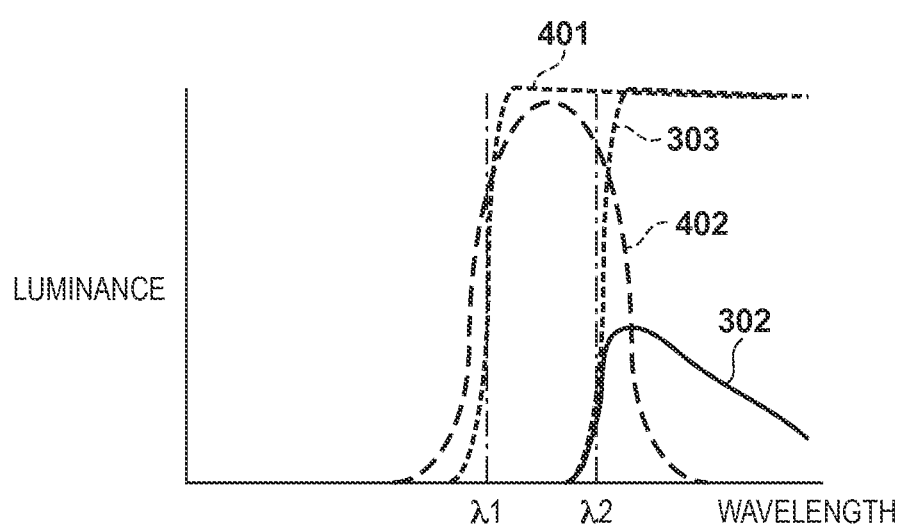

FIG. 5B exemplifies a wavelength component of the light detected by the plurality of second pixels P2 forming the second pixel group 104. In other words, FIG. 5B exemplifies a wavelength component of light corresponding to the second image obtained by using the plurality of second pixels P2 forming the second pixel group 104. In FIG. 5B, the abscissa represents the wavelength and the ordinate represents the luminance of the light from the object 110. The plurality of second pixels P2 detect, as the second image, light corresponding to a product obtained by multiplying the wavelength characteristic 402 of the light from the object 110 by the filter characteristic 401 of the optical filter 108 and the light sensitivity curve 302 of the second pixels P2.

Figure 6:
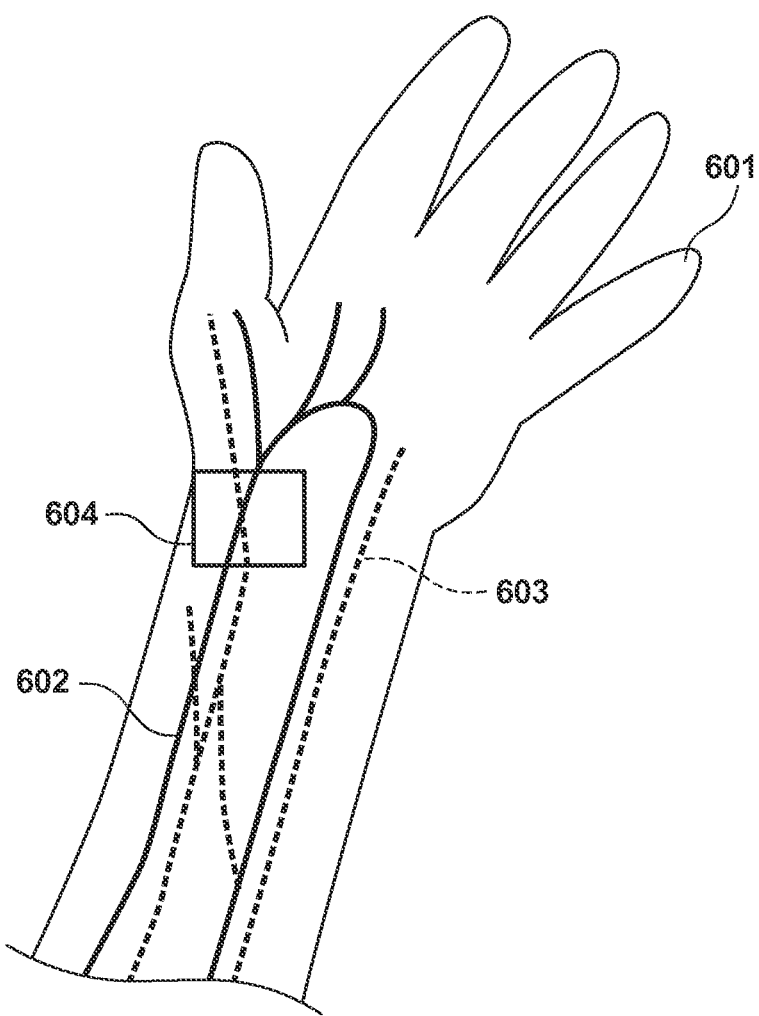
FIG. 6 is a view schematically showing an arm as an example of an object.
Figure 7A:
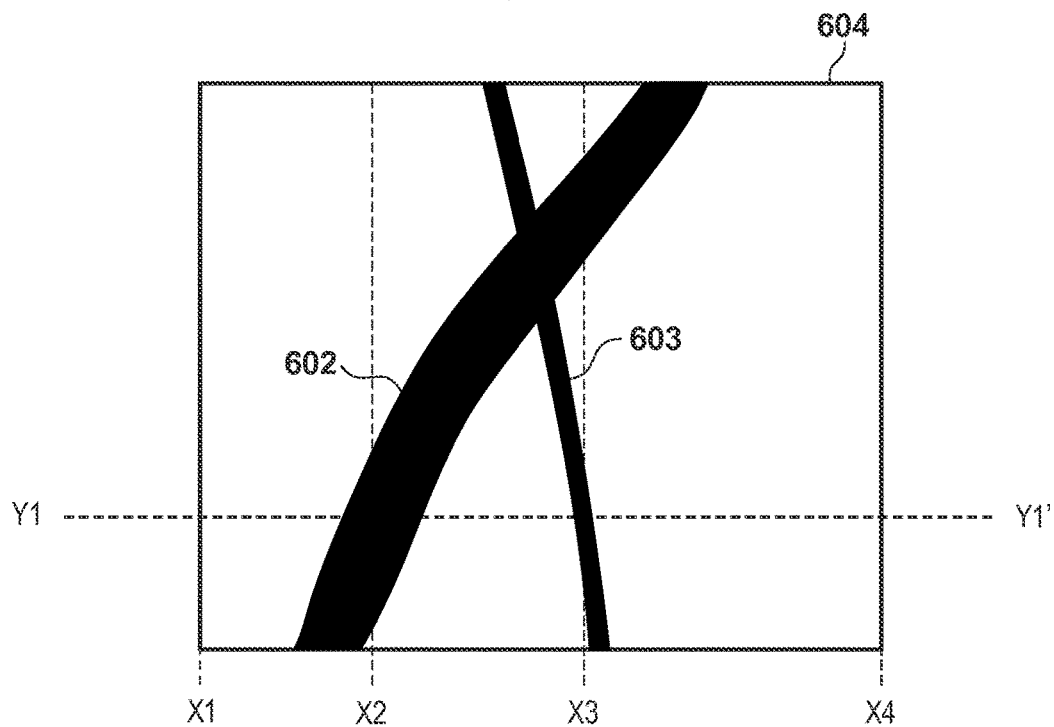
FIGS. 7A and 7B are views exemplifying an image of part of the object.
Figure 7B:
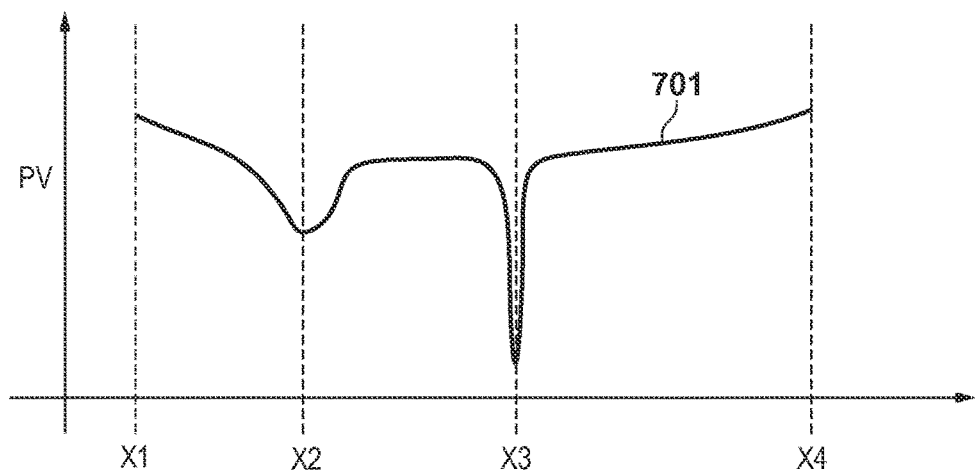

FIG. 6 schematically shows an arm as an example of the object 110. The object 110 includes an artery (arterial vessel) 602 and a vein (venous vessel) 603. FIG. 7A is an enlarged view showing a rectangular region 604 shown in FIG. 6. FIG. 7B exemplifies values PV (that is, light intensities I) of the signals of pixels arranged between coordinates X1 and X4 along a line Y1-Y1' in FIG. 7A. In a blood vessel, hemoglobin absorbs near-infrared light. Therefore, a data row 701 between the coordinates X1 and X4 indicates that the values of the signals at a coordinate λ2 crossing the artery 602 and a coordinate λ3 crossing the vein 603 are small.

Figure 8:
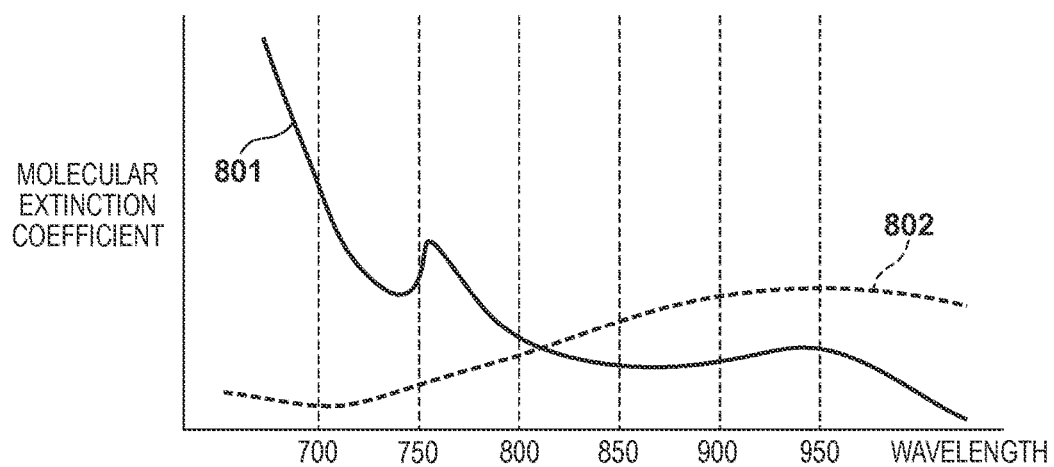
FIG. 8 is a graph exemplifying the molecular extinction coefficients of oxygenated hemoglobin and reduced hemoglobin with respect to a wavelength.

The extinction coefficient of hemoglobin will be described. Hemoglobin contained in blood carried to a lung is bonded with oxygen into oxygenated hemoglobin, and is then carried to the whole body through arteries. On the other hand, reduced hemoglobin separated from oxygen is carried to a lung through veins. FIG. 8 exemplifies the molecular extinction coefficients (ordinate) of oxygenated hemoglobin and reduced hemoglobin with respect to the wavelength (abscissa). Reference numeral 801 denotes the molecular extinction coefficient characteristic of reduced hemoglobin; and 802, the molecular extinction coefficient characteristic of oxygenated hemoglobin.

Reduced hemoglobin a large amount of which is in the vein has a molecular extinction coefficient higher than that of oxygenated hemoglobin at a wavelength shorter than about 800 nm. On the other hand, oxygenated hemoglobin a large amount of which is in the artery has a molecular extinction coefficient higher than that of reduced hemoglobin at a wavelength longer than about 800 nm. It is, therefore, possible to specify the positions and shapes of the artery and vein based on the difference between an image obtained by a near-infrared light component in a wavelength band shorter than about 800 nm and an image obtained by a near-infrared light component in a wavelength band longer than about 800 nm.

The first image obtained by using the plurality of first pixels P1 and the second image obtained by using the plurality of second pixels P2 include information of the artery (first portion) and vein (second portion) having different wavelength characteristics. The image generating unit 105 generates at least one of an image indicating the artery (first portion) and an image indicating the vein (second portion) based on the first and second images.

Figure 9A:
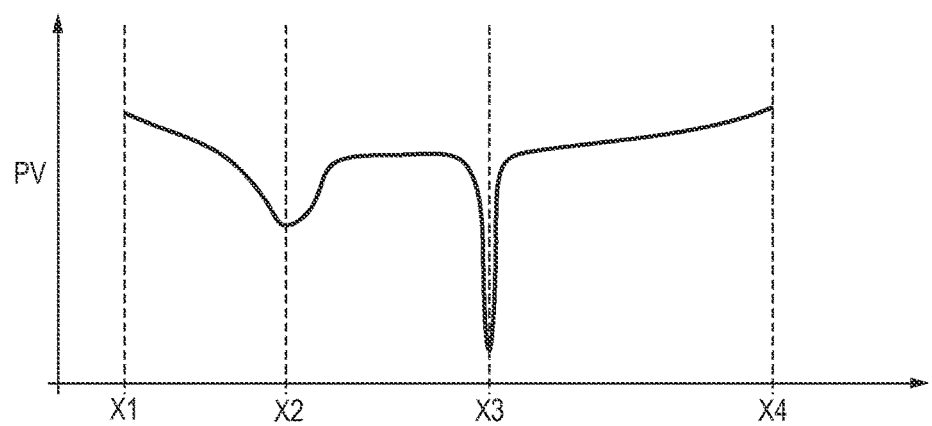
FIGS. 9A and 9B are graphs exemplifying the first image obtained by the plurality of first pixels forming the first pixel group and the second image obtained by the plurality of second pixels forming the second pixel group.
Figure 9B:
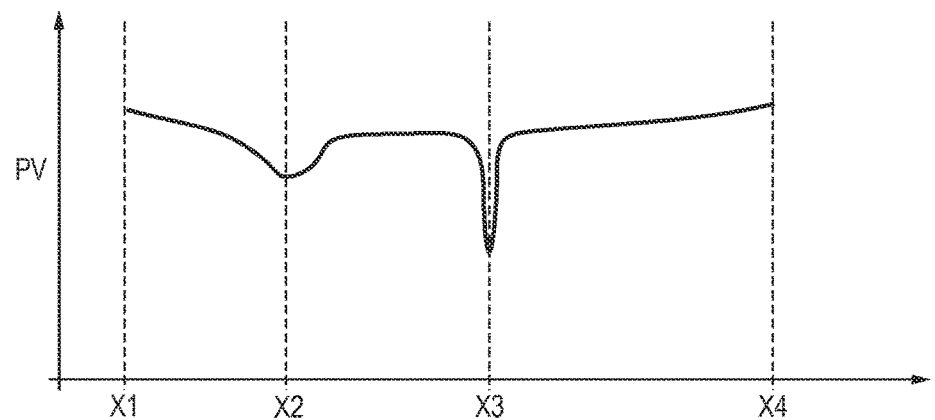

A method of obtaining, by the image generating unit 105, an image indicating the artery (first portion) and an image indicating the vein (second portion) will be described below using a practical example. FIG. 9A exemplifies the signal values of pixels arranged between the coordinates X1 and X4 along the line Y1-Y1' of the first image obtained by the plurality of first pixels P1 forming the first pixel group 103. FIG. 9B exemplifies the signal values of pixels arranged between the coordinates X1 and X4 along the line Y1-Y1' of the second image obtained by the plurality of second pixels P2 forming the second pixel group 104.

Assume that λ1=750 nm and λ2=800 nm. The plurality of first pixels P1 forming the first pixel group 103 have sensitivity to both a light component in a band of 750 nm to 800 nm (a band in which the molecular extinction coefficient of reduced hemoglobin is high) and a light component in a band of 800 nm or more (a band in which the molecular extinction coefficient of oxygenated hemoglobin is high). Therefore, the first image includes both information of the vein with a large amount of reduced hemoglobin and information of the artery with a large amount of oxygenated hemoglobin. On the other hand, the plurality of second pixels P2 forming the second pixel group 104 have sensitivity to only a light component in the band of 800 nm or more (the band in which the extinction coefficient of oxygenated hemoglobin is high). By comparing FIGS. 9A and 9B, therefore, the absorbance at the coordinate λ2 of the artery with a large amount of oxygenated hemoglobin is higher in FIG. 9B.

The molecular extinction coefficient of the vein (reduced hemoglobin) at the wavelength λ1 (750 nm) is represented by α750, and the molecular extinction coefficient of the vein (reduced hemoglobin) at the wavelength λ2 (800 nm) is represented by α800. The molecular extinction coefficient of the artery (oxygenated hemoglobin) at the wavelength $\lambda 1$ (750 nm) is represented by $\beta 750$, and the molecular extinction coefficient of the artery (oxygenated hemoglobin) at the wavelength $\lambda 2$ (800 nm) is represented by $\beta 800$. Furthermore, a known value M represents the ratio between the light intensity of the light emitted by the light source 109 at the wavelength $\lambda 1$ (750 nm) and that of the light at the wavelength $\lambda 2$ (800 nm).

Also, the signal value of a pixel around a pixel to be detected at the wavelength $\lambda 1$ (750 nm) is represented by I750, and the signal value of the pixel around the pixel to be detected at the wavelength $\lambda 2$ (800 nm) is represented by I800.

In the venous portion, the signal value of the first pixel P1 for incident light at the wavelength $\lambda 1$ (750 nm) is $I1=(1-\alpha 750) \times I750$.

In the venous portion, the signal value of the first pixel P1 for incident light at the wavelength $\lambda 2$ (800 nm) is $I2=(1-\alpha 800) \times I800$.

In the arterial portion, the signal value of the first pixel P1 for incident light at the wavelength $\lambda 1$ (750 nm) is $I3=(1-\beta 750) \times I750$.

In the arterial portion, the signal value of the first pixel P1 for incident light at the wavelength $\lambda 2$ (800 nm) is $I4=(1-\beta 800) \times I800$.

In the venous portion, the signal value of the second pixel P2 for incident light at the wavelength $\lambda 2$ (800 nm) is $L2=(1-\alpha 800) \times I800$.

In the arterial portion, the signal value of the second pixel P2 for incident light at the wavelength $\lambda 2$ (800 nm) is $L4=(1-\beta 800) \times I800$.

Therefore, the signal value of the first pixel P1 onto which the venous portion has been projected is given by:

$$I1+I2=(1-\alpha 750) \times I750+(1-\alpha 800) \times I800=\{(1-\alpha 750) \times M+(1-\alpha 800)\} \times I800 \quad (1)$$

The signal value of the first pixel P1 onto which the arterial portion has been projected is given by:

$$I3+I4=(1-\beta 750) \times I750+(1-\beta 800) \times I800=\{(1-\beta 750) \times M+(1-\beta 800)\} \times I800 \quad (2)$$

The signal value of the second pixel P2 onto which the venous portion has been projected is given by:

$$L2=(1-\alpha 800) \times I800 \quad (3)$$

The signal value of the second pixel P2 onto which the arterial portion has been projected is given by:

$$L4=(1-\beta 800) \times I800 \quad (4)$$

Based on equations (1) and (3), a ratio K between the signal values of the first pixel P1 and second pixel P2 which are adjacent to each other and onto which the venous portion has been projected is given by:

$$K=\{(1-\alpha 750) \times M+(1-\alpha 800)\} \times I800/\{(1-\alpha 800) \times I800\}=\{(1-\alpha 750)/(1-\alpha 800)\} \times M+1$$

Also, based on equations (2) and (4), a ratio K between the signal values of the first pixel P1 and second pixel P2 which are adjacent to each other and onto which the arterial portion has been projected is given by:

$$K=\{(1-\beta 750) \times M+(1-\beta 800)\} \times I800/\{(1-\beta 800) \times I800\}=\{(1-\beta 750)/(1-\beta 800)\} \times M+1$$

As an example, assume that the known values are M=2, $\alpha 750=0.4$, $\alpha 800=0.3$, $\beta 750=0.2$, and $\beta 800=0.3$. In this case, $$K(\text{venous portion})=((1-0.4)/(1-0.3)) \times 2+1=(0.6/0.7) \times 2+1=2.7$$

$$K(\text{arterial portion})=((1-0.2)/(1-0.3)) \times 2+1=(0.8/0.7) \times 2+1=3.3$$

Consequently, it is possible to identify the artery and vein by comparing the values of K with a threshold TH. For example, the threshold TH is set to 3. If the ratio K between the signal values of the first pixel P1 and second pixel P2 which are adjacent to each other is larger than the threshold TH, it can be determined that the first pixel P1 and second pixel P2 correspond to the arterial portion; otherwise, it can be determined that the first pixel P1 and second pixel P2 correspond to the venous portion. At this time, the value of K need not be calculated for all the pixels. For example, it may be determined that a portion where the values of pixels of the first image are smaller than a predetermined value is a portion where the artery or vein exists, and the value of K may be calculated for only the pixels (the first pixels P1 and second pixels P2) forming the portion.

Figure 10A:
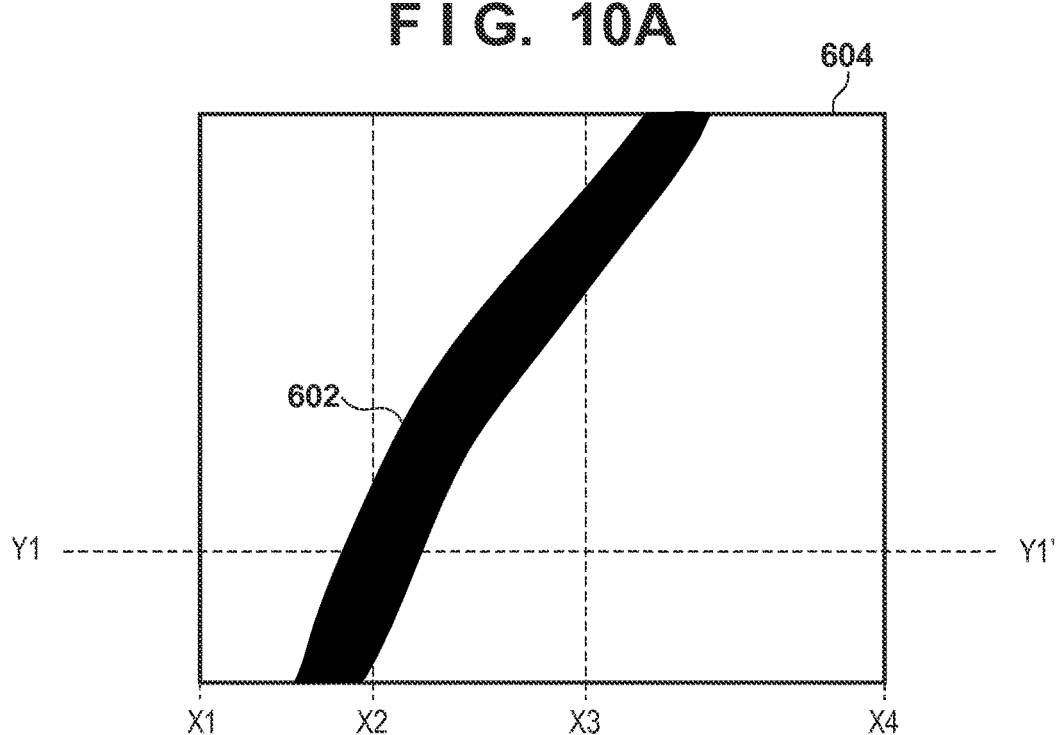
FIGS. 10A and 10B are views exemplifying an arterial image and a venous image generated from the first and second images.
Figure 10B:
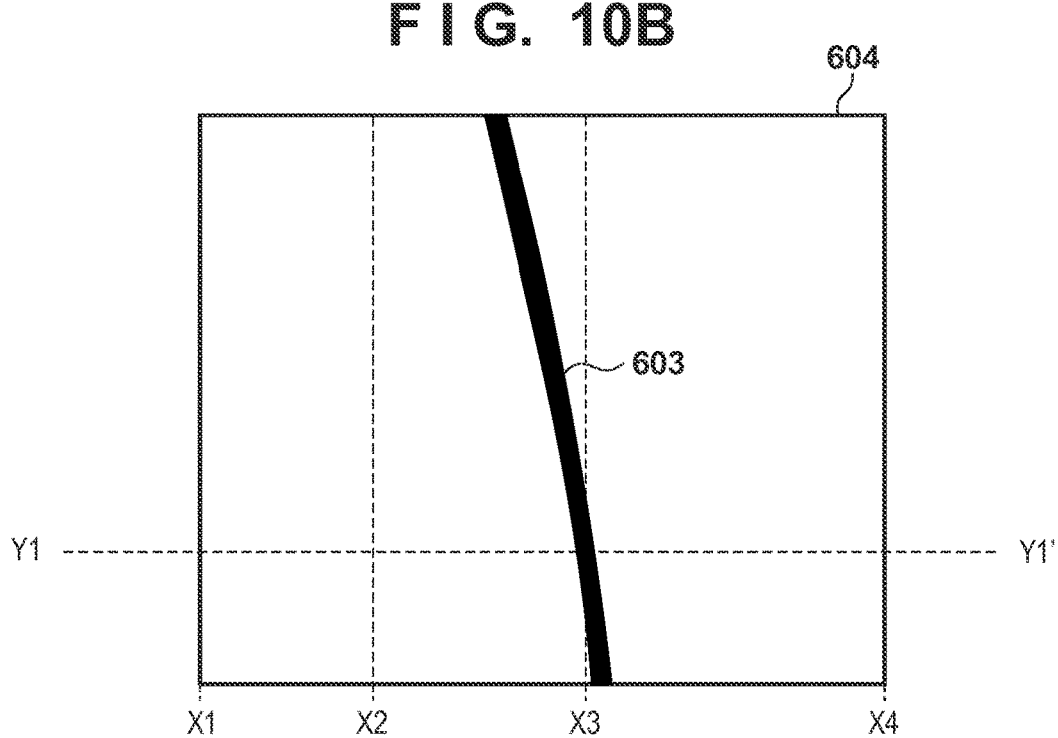

That is, the image generating unit 105 can determine the artery and vein based on the first image obtained by using the plurality of first pixels P1 forming the first pixel group 103 and the second image obtained by using the plurality of second pixels P2 forming the second pixel group 104. FIG. 10A exemplifies an arterial image generated by the image generating unit 105 from the first and second images. FIG. 10B exemplifies a venous image generated by the image generating unit 105 from the first and second images.

With closing processing of performing expansion processing for the thus generated arterial image M times, and performing contraction processing N times, it is possible to obtain a continuous vascular image by filling a blood vessel path broken due to noise or the like.

The image sensing unit 102 can be configured to repeatedly capture and output an image (the first and second images) of the object 110. In response to this, the image generating unit 105 can be configured to repeatedly generate an arterial image and a venous image.

Figure 11:
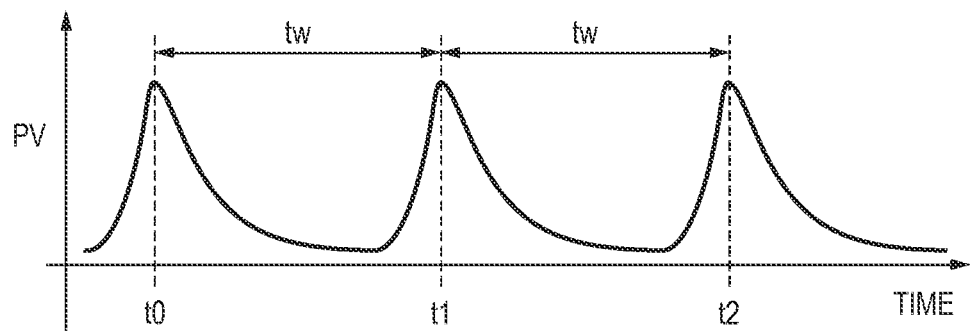
FIG. 11 is a timing chart exemplifying a temporal change in value of a pixel in an arbitrary portion of the arterial image.

The analyzing unit 107 analyzes a temporal change of an image generated by the image generating unit 105. The analyzing unit 107, for example, analyzes a temporal change of an arterial image generated by the image generating unit 105, and detects pulsation. This can be done by extracting a periodic component from the temporal change of the arterial image. More specifically, as exemplified in FIG. 11, it is possible to extract a periodic component from a temporal change of the value of a pixel in an arbitrary portion of the arterial image. In the example of FIG. 11, almost equal peak values appear at t=t0, t1, and t2, and periodicity of a period tw is shown. The period tw represents the period of a pulse, thereby obtaining a pulse rate by the number of peaks per minute.

Figure 12:
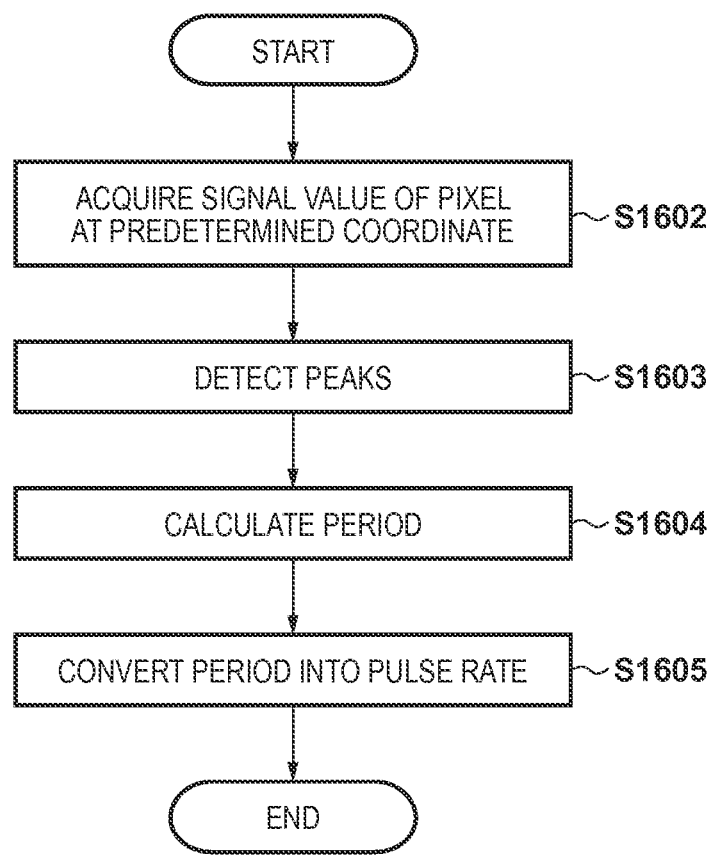
FIG. 12 is a flowchart exemplifying a pulse rate detection sequence by an analyzing unit.

FIG. 12 exemplifies a pulse rate detection sequence by the analyzing unit 107. In step S1602, the analyzing unit 107 extracts the signal value of a pixel arranged at a predetermined coordinate from each of the plurality of arterial images continuously generated by the image generating unit 105, and obtains a temporal change. In step S1603, the analyzing unit 107 detects a plurality of peaks from the temporal change of the signal value obtained in step S1602. In step S1604, the analyzing unit 107 calculates a period based on the time interval between the plurality of peaks obtained in step S1602. In step S1605, the analyzing unit 107 converts the period into a pulse rate.

According to the first embodiment, by arranging the first pixel group 103 and the second pixel group 104 in the image sensing unit 102, the simultaneity of the first image obtained by using the first pixel group 103 and the second image obtained by using the second pixel group 104 is ensured. Therefore, a variation in relative positions of the object 110 and imaging device 101, a variation in light emitted by the light source 109, a change in external light, and the like have almost no influence.

In the first embodiment, an arterial image is obtained using the oxygen saturation of blood. The present invention, however, is also applicable to other applications. For example, new blood vessels increase around cancer cells. A large amount of oxygenated hemoglobin exists and the amount of reduced hemoglobin relatively decreases. This can be used to acquire an image indicating cancer cells. If blood circulation to capillaries is bad like diabetes, the amount of reduced hemoglobin is large in a portion where blood flow stagnates. This can be used to acquire an image indicating the distribution of portions where blood circulation is bad.

A case in which the light sensitivity curve 302 of the second pixel P2 has no local maximum value near the wavelength $\lambda 1$ has been described. In this embodiment, however, the cutoff wavelength of the light characteristic 303 of the second pixels P2 may be set to be shorter than the wavelength $\lambda 1$, and the light sensitivity curve 302 may have a local maximum value at the wavelength $\lambda 1$. In this case, the light sensitivity of the second pixels P2 at the wavelength $\lambda 1$ need only be smaller than that of the first pixel P1 at the same wavelength to the extent that it is possible to extract the first portion of the object based on the difference between signals output from the first pixel P1 and second pixel P2. Preferably, the light sensitivity of the second pixels P2 at the wavelength $\lambda 1$ is equal to or less than 10% of the light sensitivity of the first pixels P1 at the same wavelength. As another example, the first pixels P1 and the second pixels P2 may have equal light sensitivities at the wavelength $\lambda 1$. In this case, the light sensitivity of the first pixels P1 at the wavelength $\lambda 2$ need only be smaller than that of the second pixels P2 at the same wavelength.

Preferably, the light sensitivity of the first pixels P1 at the wavelength $\lambda 2$ is equal to or less than 10% of the light sensitivity of the second pixels P2 at the same wavelength. If the light sensitivity of the first pixels P1 at the wavelength $\lambda 2$ is equal to or less than 10% of the light sensitivity of the second pixels P2 at the same wavelength, the first and second images can be separated to the extent that there is no practical problem.

In the above description, the light sensitivity of the first pixels P1 has local maximum values near the near-infrared wavelengths $\lambda 1$ and $\lambda 2$, and the light sensitivity of the second pixels P2 has a local maximum value only near the near-infrared wavelength $\lambda 2$. As a comparative example, consider a case in which the light sensitivity of the first pixels P1 has a local maximum value only near the near-infrared wavelength $\lambda 1$ and the light sensitivity of the second pixel P2 has a local maximum value only near the near-infrared wavelength $\lambda 2$. In the comparative example, the image generating unit 105 generates the first image by signals based on the first pixels P1 and the second image by signals based on the second pixels P2, and detects a vein from the first image and an artery from the second image.

On the other hand, in this embodiment, as described with reference to FIG. 3A, the light sensitivity of the first pixels P1 has local maximum values near the near-infrared wavelengths $\lambda 1$ and $\lambda 2$. If near-infrared rays of the same light amount enter the first pixels P1 having sensitivity near the wavelengths $\lambda 1$ and $\lambda 2$ as shown in FIG. 3A and pixels (comparative example) having a local maximum value of the light sensitivity only near the wavelength $\lambda 1$, the signal values of the first pixels P1 having the light sensitivity shown in FIG. 3A are larger. Therefore, as compared with a case in which there is a local maximum value only near the wavelength $\lambda 1$, the first pixels P1 having the light sensitivity shown in FIG. 3A can improve the S/N ratio.

Second Embodiment

Figure 13:
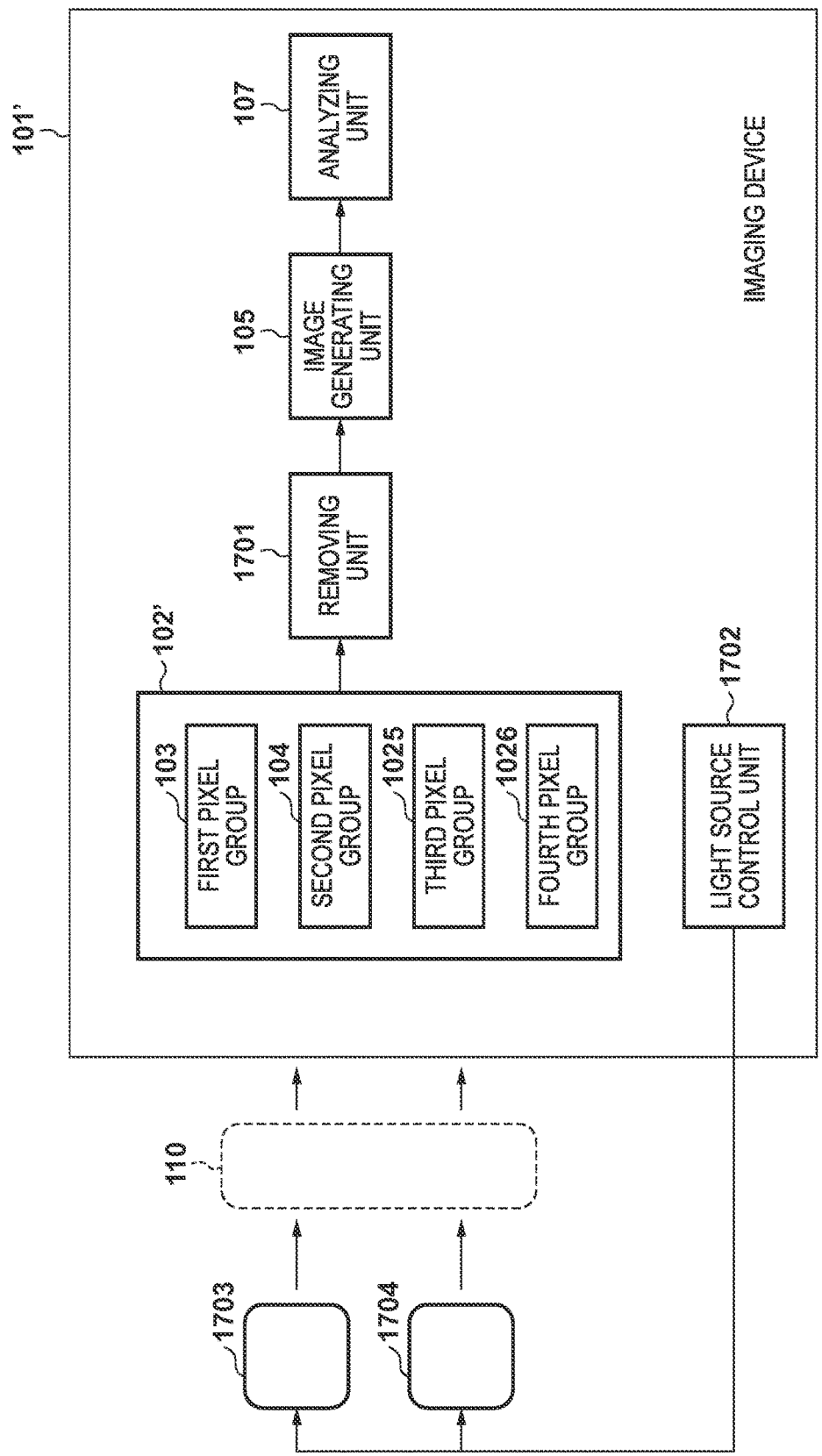
FIG. 13 is a block diagram for explaining the arrangement of an imaging device according to the second embodiment of the present invention.

The arrangement of an imaging device 101' according to the second embodiment of the present invention will be described with reference to FIG. 13. Note that details not mentioned in the second embodiment can conform to the first embodiment. The imaging device 101' according to the second embodiment includes a removing unit 1701 which removes a background light component by image processing, instead of the optical filter 108. The imaging device 101' according to the second embodiment includes a light source control unit 1702 which controls two light sources 1703 and 1704 for illuminating an object 110. The two light sources 1703 and 1704 respectively emit light beams in different near-infrared bands. More specifically, the light source 1703 emits light in a near-infrared band between wavelengths $\lambda 1$ and $\lambda 2$. The light source 1704 emits light in a near-infrared band longer than the wavelength $\lambda 2$.

Figure 14:
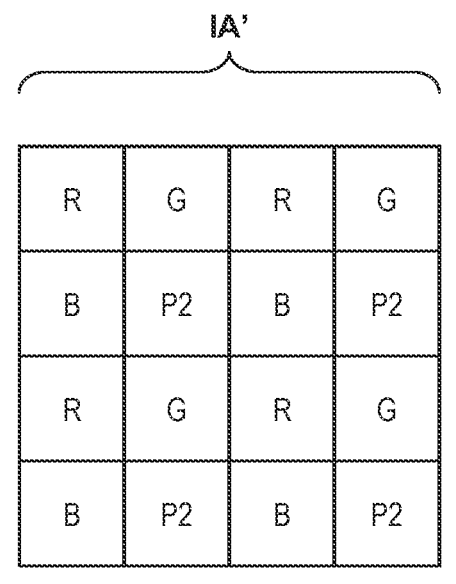

An image sensing unit 102' includes a first pixel group 103, a second pixel group 104, a third pixel group 1025, and a fourth pixel group 1026. FIG. 14 schematically shows an imaging region IA' of the image sensing unit 102'. In the imaging region IA', a plurality of first pixels R forming the first pixel group 103 are distributed and arranged. The first pixels R are pixels having sensitivity in the wavelength band of red (visible light) and the near-infrared band. In the imaging region IA', a plurality of second pixels P2 forming the second pixel group 104 are also distributed and arranged. The second pixels P2 are pixels having sensitivity in the near-infrared band. In the imaging region IA', third pixels B forming the third pixel group 1025 are distributed and arranged. The third pixels B are pixels having sensitivity in the wavelength band of blue (visible light). The third pixels B may be configured to have sensitivity in the near-infrared band in addition to the wavelength band of blue (visible light).

Furthermore, in the imaging region IA', fourth pixels G forming the fourth pixel group 1026 are distributed and arranged. The fourth pixels G are pixels having sensitivity in the wavelength band of green (visible light). The fourth pixels G may be configured to have sensitivity in the near-infrared band in addition to the wavelength band of green (visible light).

Figure 15A:
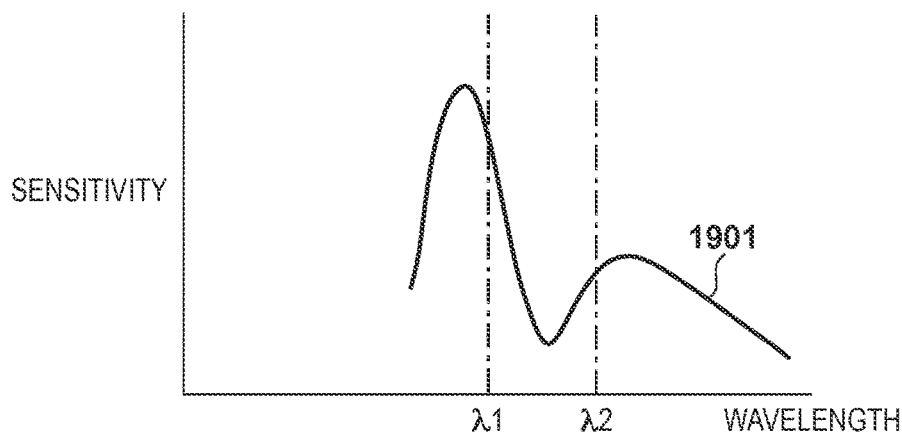
FIGS. 15A to 15C are graphs exemplifying the light sensitivity characteristics of the first, second, and third pixels, respectively.
Figure 15B:
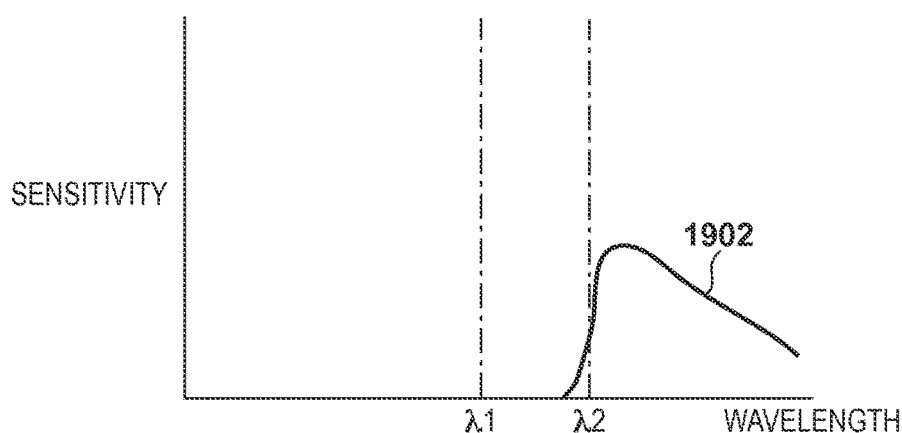
Figure 15C:
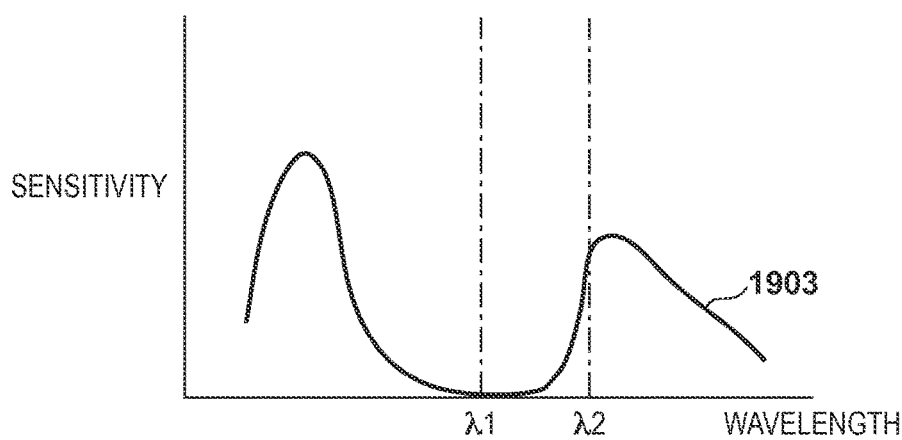

FIG. 15A exemplifies the light sensitivity characteristic of the first pixels R. FIG. 15B exemplifies the light sensitivity characteristic of the second pixels P2. FIG. 15C exemplifies the light sensitivity characteristic of the third pixels B when the third pixels B are configured to have sensitivity in the near-infrared band in addition to the wavelength band of blue (visible light). In FIGS. 15A to 15C, the abscissa represents the wavelength and the ordinate represents the sensitivity. The wavelengths $\lambda 1$ and $\lambda 2$ are different wavelengths in the near-infrared band. A light sensitivity curve 1901 indicates the light sensitivity characteristic of the first pixels R, and a light sensitivity curve 1902 indicates the light sensitivity characteristic of the second pixels P2. Also, a light sensitivity curve 1903 indicates the light sensitivity characteristic of the third pixels B. In an example, $\lambda 1=720$ nm and $\lambda 2=790$ nm.

When the third pixels B are configured to have sensitivity in both the wavelength band of blue and the near-infrared band, a wavelength at which the second pixels P2 start to transmit the near-infrared band may be set to coincide with a wavelength at which the third pixels B start to transmit the near-infrared band, as exemplified in FIGS. 15B and 15C. That is, the near-infrared transmission wavelength band of the wavelength filters of the second pixels P2 may be set to coincide with that of the wavelength filters of the third pixels B. In this case, a process of forming wavelength filters for transmitting the near-infrared band is shared between the second pixels P2 and the third pixels B, which is useful to reduce the number of steps.

By arranging the pixels R, B, and G having sensitivities in the visible wavelength bands of red, blue, and green, respectively, in addition to the second pixels P2, it is possible to acquire a color image of the object simultaneously with acquisition of a vascular image in the near-infrared band.

Figure 16A:
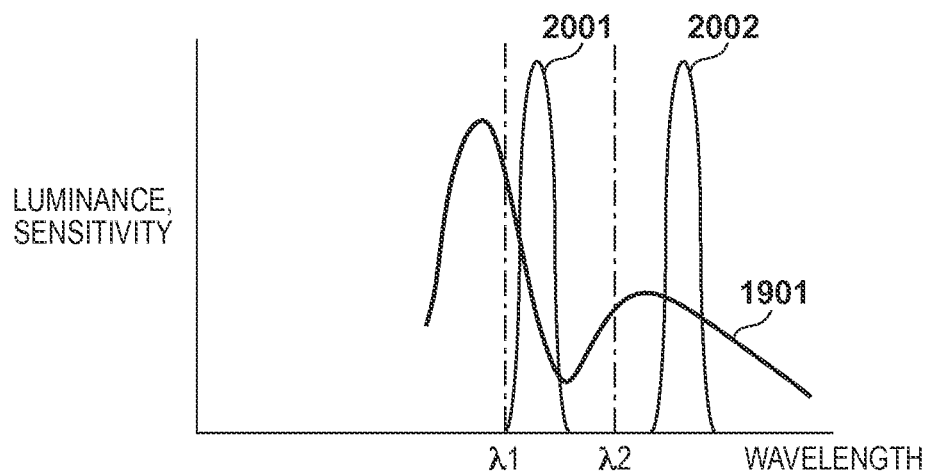
FIGS. 16A and 16B are graphs exemplifying a wavelength component included in the first image obtained by a plurality of first pixels forming the first pixel group and a wavelength component included in the second image obtained by a plurality of second pixels forming the second pixel group.

The operation of the imaging device 101' when there is no background light will be described. FIG. 16A exemplifies a wavelength component included in the first image obtained by the plurality of first pixels R forming the first pixel group 103. In this example, the light source 1703 has an emission wavelength characteristic (the relationship between the wavelength and the luminance of light to be emitted) 2001, and the light source 1704 has an emission wavelength characteristic 2002. The sum of a value obtained by integrating the product of the light sensitivity curve 1901 of the first pixels R and the emission wavelength characteristic 2001 with respect to the wavelength and a value obtained by integrating the product of the light sensitivity curve 1901 of the first pixels R and the emission wavelength characteristic 2002 with respect to the wavelength corresponds to a light component acquired in the first pixels R.

Figure 16B:
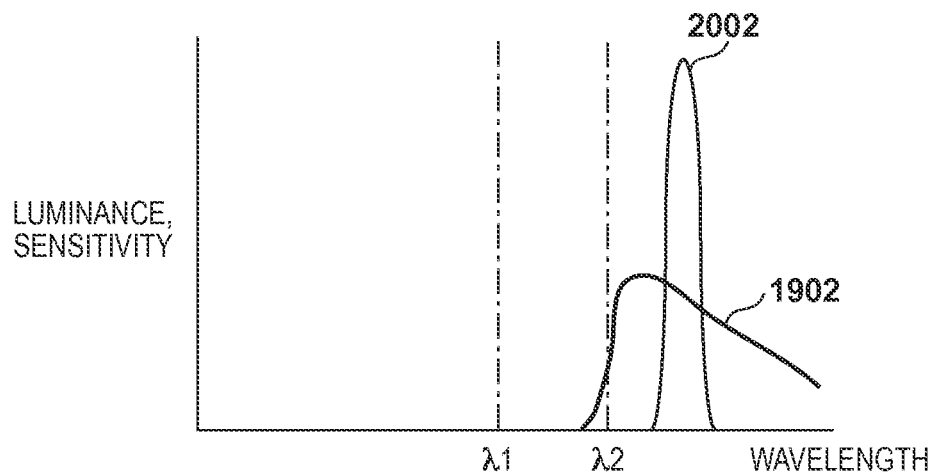

FIG. 16B exemplifies a wavelength component included in the second image obtained by the plurality of second pixels P2 forming the second pixel group 104. A value obtained by integrating the product of the light sensitivity curve 1902 of the second pixels P2 and the emission wavelength characteristic 2002 with respect to the wavelength corresponds to a light component acquired in the second pixels P2.

Similarly to the first embodiment, the image generating unit 105 can generate at least one of an image indicating the first portion (artery) and an image indicating the second portion (vein) based on the first and second images. More specifically, the image generating unit 105 generates, for example, an image indicating an artery based on the first and second images. Similarly to the first embodiment, the analyzing unit 107 analyzes a temporal change of the image generated by the image generating unit 105. More specifically, the analyzing unit 107 can obtain a pulse rate based on the temporal change of the arterial image generated by the image generating unit 105.

Figure 17A:
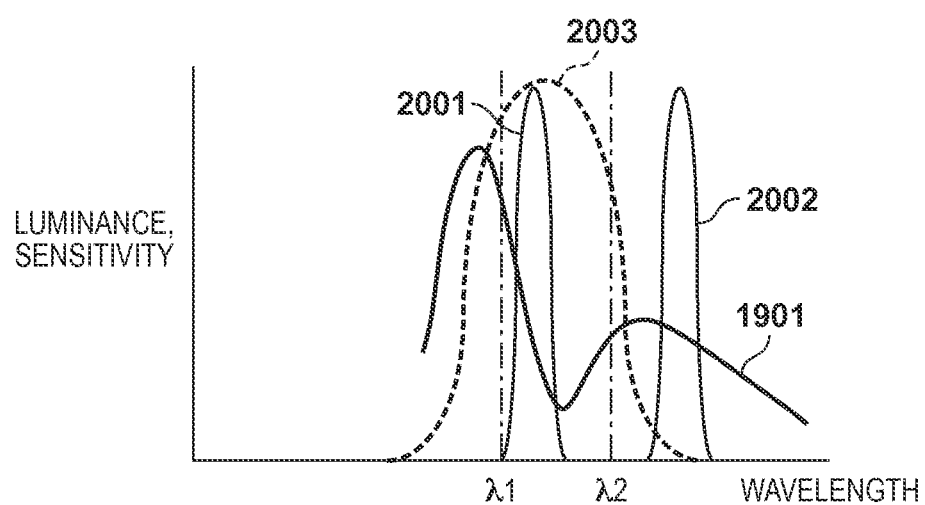
FIGS. 17A and 17B are graphs exemplifying a background light component removing method.
Figure 17B:
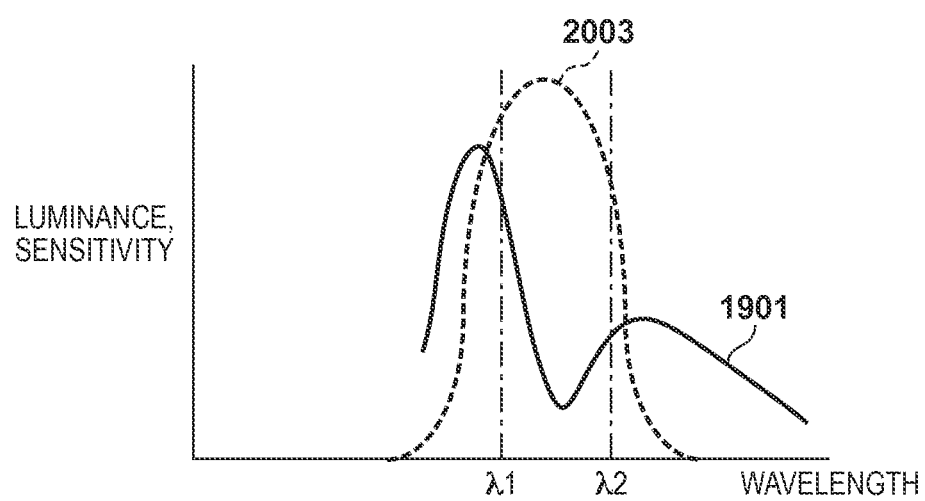

The operation of the imaging device 101' when there is background light will be described next. If there is background light, the removing unit 1701 removes a background light component by image processing. Each of FIGS. 17A and 17B exemplifies a wavelength component included in the first image obtained by the plurality of first pixels R forming the first pixel group 103. Referring to FIGS. 17A and 17B, background light 2003 is exemplified. FIG. 17A exemplifies a state in which the light sources 1703 and 1704 are ON. FIG. 17B exemplifies a state in which the light sources 1703 and 1704 are OFF.

When the background light 2003 exists, the first image obtained by using the plurality of first pixels R forming the first pixel group 103 includes a component of the background light 2003, as exemplified in FIGS. 17A and 17B. The removing unit 1701 controls the light source control unit 1702 to acquire the first image in the state (FIG. 17A) in which the light sources 1703 and 1704 are ON and in the state (FIG. 17B) in which the light sources 1703 and 1704 are OFF. The removing unit 1701 removes the background light component by obtaining the difference between the first image obtained in the state in which the light sources 1703 and 1704 are ON and the first image obtained in the state in which the light sources 1703 and 1704 are OFF. The removing unit 1701 can be implemented by a computer such as a CPU, and a computer program that causes the computer to operate as the removing unit 1701.

Third Embodiment

A fluorescence method is one of living body analysis methods capable of performing noninvasive measurement and acquiring an image, and is used for biotechnological research, medical application, and the like. The fluorescence method is to irradiate a fluorescent material with light (excitation light) of a specific wavelength to emit fluorescence of a wavelength longer than that of excitation light, and observe the fluorescence. The third embodiment exemplifies an application of the fluorescence method. More specifically, an object is irradiated with excitation light of a visible wavelength, and fluorescence emitted at an infrared wavelength is detected.

The third embodiment of the present invention will be described with reference to FIGS. 18 to 21. In the third embodiment, a fluorescent material is infused into a specific portion of a living body, and the specific portion is irradiated with visible light as excitation light from the first light source, and is also irradiated with near-infrared light as background light from the second light source. A near-infrared image by the fluorescence and an infrared image by the background light are simultaneously acquired without detecting the excitation light as visible light. Note that details not mentioned in the third embodiment can conform to the second embodiment.

Figure 18:
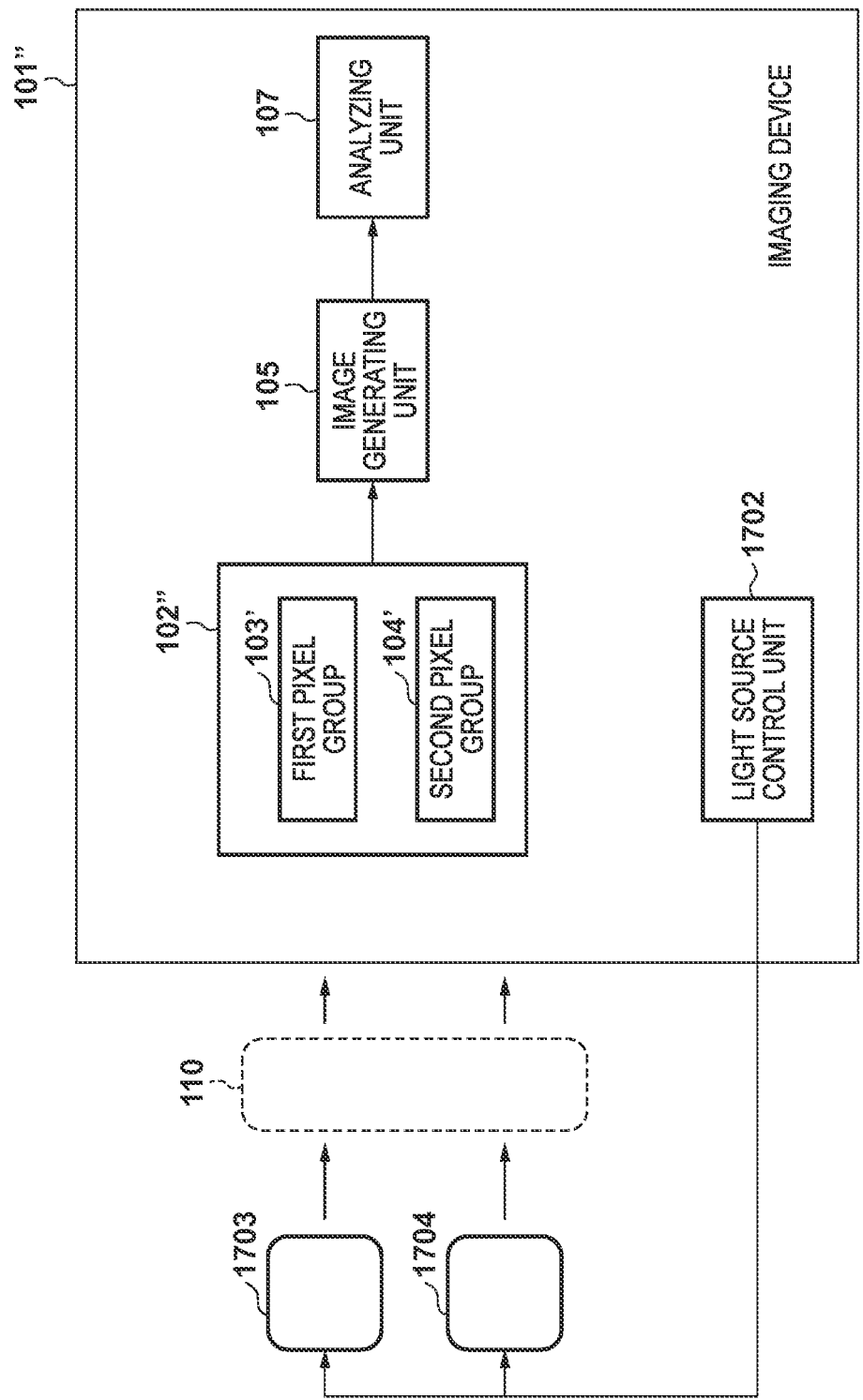
FIG. 18 is a block diagram for explaining the arrangement of an imaging device according to the third embodiment.

An imaging device 101" according to the third embodiment shown in FIG. 18 has almost the same arrangement as that of the imaging device 101' according to the second embodiment. In the third embodiment, since background light is actively used, the imaging device 101" includes no removing unit 1701 which removes a background light component of the imaging device 101". Alternatively, even if a removing unit 1701 is included, it is not used. An image sensing unit 102" includes a first pixel group 103' and a second pixel group 104'.

Figure 19:
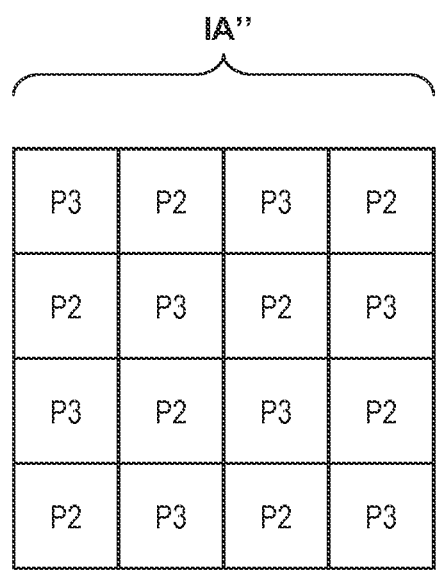
FIG. 19 is a view schematically showing the imaging region of an image sensing unit incorporated in the imaging device according to the third embodiment.

FIG. 19 schematically shows an imaging region IA" of the image sensing unit 102". In the imaging region IA", a plurality of first pixels P3 forming the first pixel group 103' are distributed and arranged. The first pixels P3 are pixels having sensitivity in the first near-infrared band. In the imaging region IA", a plurality of second pixels P2 forming the second pixel group 104' are also distributed and arranged. The second pixels P2 are pixels having sensitivity in the second near-infrared band.

Figure 20A:
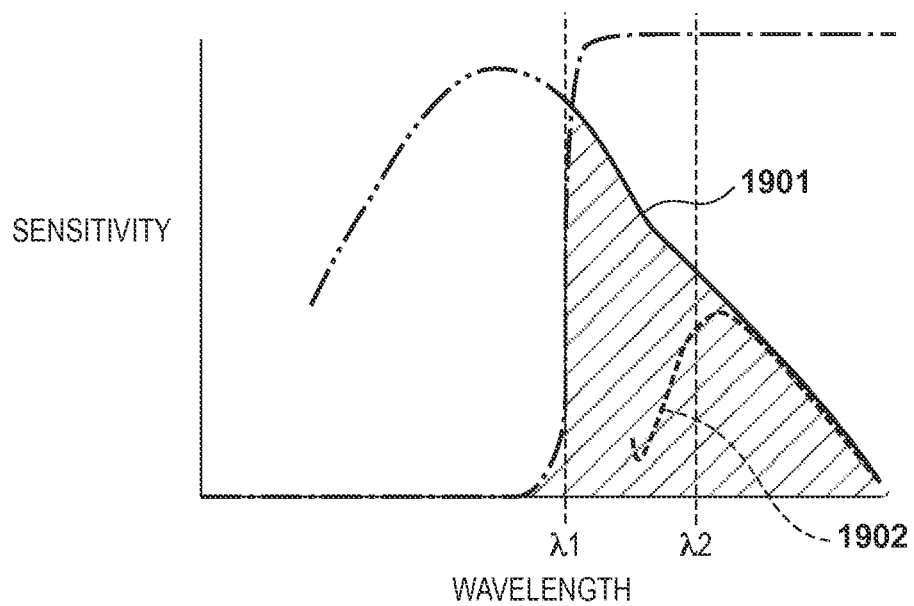
FIGS. 20A and 20B are graphs exemplifying the light sensitivity characteristics of the first and second pixels of the image sensing unit according to the third embodiment.
Figure 20B:
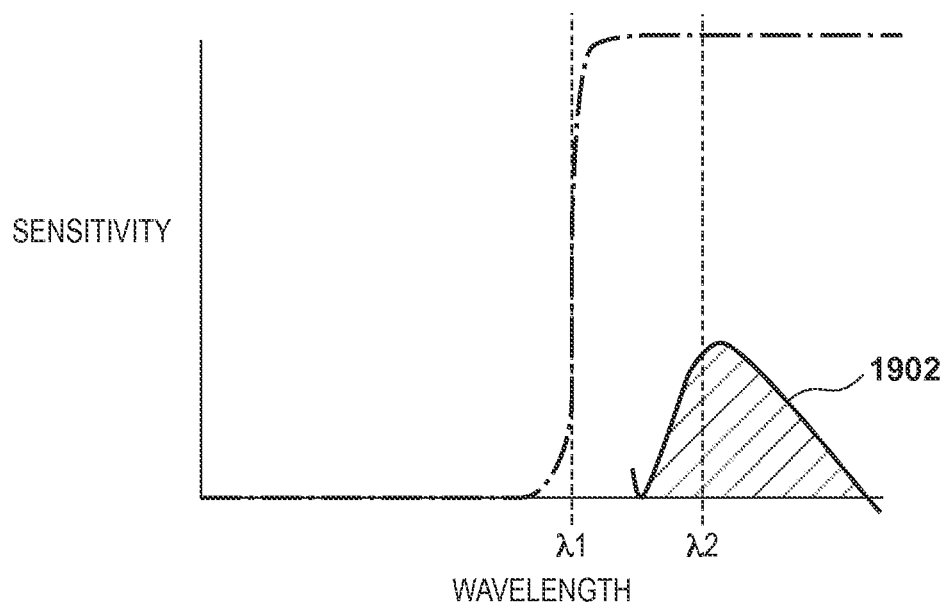

FIG. 20A exemplifies the light sensitivity characteristic of the first pixels P3. FIG. 20B exemplifies the light sensitivity characteristic of the second pixels P2. In FIGS. 20A and 20B, the abscissa represents the wavelength and the ordinate represents the sensitivity. A first wavelength $\lambda 1$ and a second wavelength $\lambda 2$ are different wavelengths in the near-infrared band. The first pixels P3 have a light sensitivity curve 1901 indicated by a solid line in FIG. 20A. In the light sensitivity curve 1901, sensitivity at wavelengths (a portion indicated by a two-dot dashed line) shorter than the wavelength λ1 is cut off by a characteristic indicated by a one-dot dashed line, and is almost equal to 0. Referring to FIG. 20B, a light sensitivity curve 1902 indicates the light sensitivity characteristic of the second pixels P2. The light sensitivity characteristic of the second pixels P2 is also indicated by a dotted line in FIG. 20A. In this example, λ1=700 nm and λ2=800 nm.

Figure 21A:
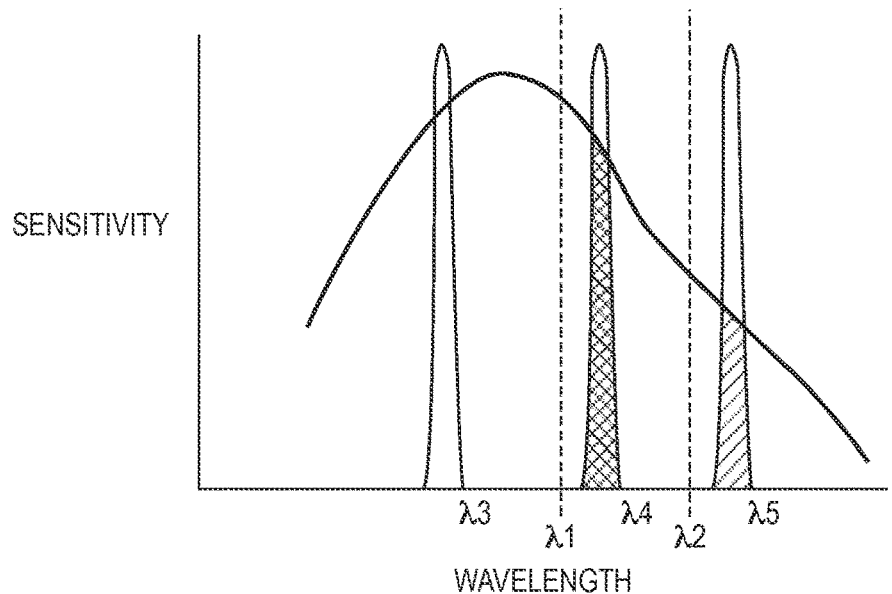
FIGS. 21A and 21B are graphs exemplifying the relationships between the wavelength of each light beam and the light sensitivity characteristics of the first and second pixels of the image sensing unit according to third embodiment, respectively.
Figure 21B:
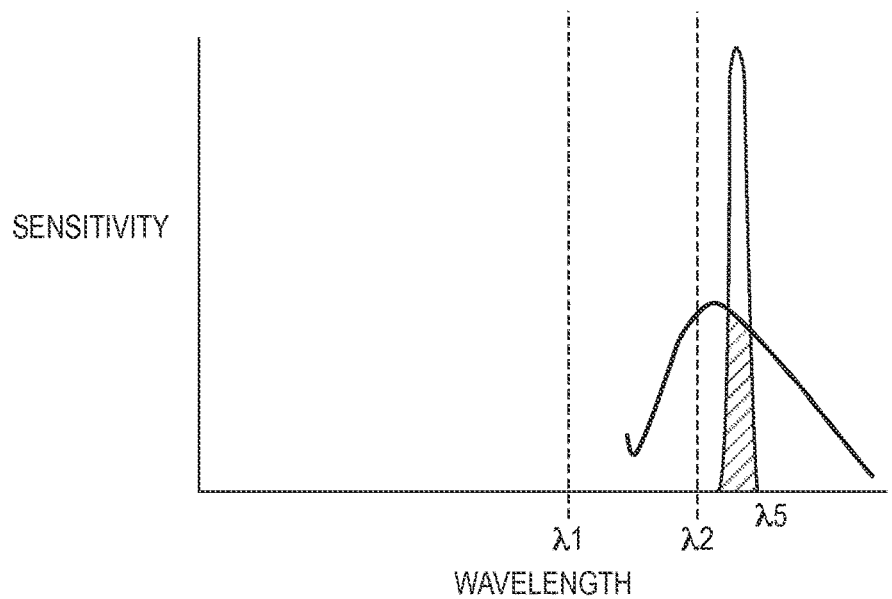

FIGS. 21A and 21B show the relationships between the wavelength distribution of light and the light sensitivity characteristics of the first pixels P3 and second pixels P2 according to the third embodiment, respectively. Referring to FIGS. 21A and 21B, λ3 represents the wavelength of visible light as excitation light from a first light source 1703, λ4 represents the wavelength of fluorescence as near-infrared light generated by excitation, and λ5 represents the wavelength of near-infrared light as background light from a second light source 1704. In this example, λ3=650 nm, λ4=750 nm, and α5=850 nm.

The light having the wavelength λ3 as a center from the first light source 1703 and the light having the wavelength λ5 as a center from the second light source 1704 have narrow wavelength distributions. The first light source 1703 and second light source 1704 each of which emits such light can be lasers or LEDs. Fluorescence generated by excitation by the light emitted by the first light source 1703 also has a narrow wavelength distribution having the wavelength λ4 as a center.

The excitation light has a visible wavelength, and neither the first pixels P3 nor the second pixels P2 have sensitivity at the visible wavelength. Therefore, neither the first pixels P3 nor the second pixels P2 detect the excitation light. On the other hand, among the fluorescence and background light which have infrared wavelengths, the background light having the longer wavelength is detected by both the first pixel P3 and the second pixel P2. Note that since the first pixels P3 and the second pixels P2 have almost equal light sensitivity characteristics in a predetermined band from the second wavelength λ2 to a predetermined wavelength longer than the second wavelength λ2, they detect the background light at the same intensity level. On the other hand, the fluorescence has the wavelength cut off by the first pixels P3, and is thus detected by only the second pixels P2. The fluorescence is weak, and may thus be buried in noise caused by the background light. To cope with this, the first image (image A) is generated by interpolating data obtained from only the first pixels P3, and the second image (image B) is generated by interpolating data obtained from only the second pixels P2, thereby calculating the difference between the images for each pixel. With this processing, it is possible to obtain an image (image C) of only a fluorescent portion. That is, it is possible to obtain image C of only a fluorescent portion by calculating the difference between images A and B.

By obtaining image C of only the fluorescent portion and image B of only the background light, and combining image B and image C' obtained by coloring image C of the only the fluorescent portion, it is possible to obtain image D in which distribution of portions responding to the fluorescence in the living body is clearly visualized.

As described above, according to the third embodiment, it is possible to simultaneously obtain an image of a fluorescent portion and an image of the inside of the living body using one image sensing unit. This is effective at observing a moving living body (for example, a blood vessel of a moving heart into which a fluorescent material has been infused and its surrounding tissue, a portion inside the body of a moving animal into which a specific fluorescent material has been infused and its surround portion, or the like).

In general, only an image of a fluorescent portion is detected by cutting off excitation light. In this case, however, a portion other than the fluorescent portion cannot be visualized, and it is thus impossible to grasp the relationship with a surrounding condition such as the inside of the living body other than the fluorescent region. Alternatively, if there exists light from a surrounding environment, which has the same infrared wavelength as that of fluorescence to be detected, it is possible to simultaneously obtain an image of the inside of the living body other than the fluorescent portion. However, it is impossible to separate the portion from the fluorescent portion, resulting in noise. Furthermore, although a camera which simultaneously captures visible light and infrared fluorescence has been put into practice, visible light is obtained simultaneously with infrared fluorescence. Consequently, it is impossible to simultaneously visualize the inside of the living body, and only the condition of the surface of the living body is observed.

In the third embodiment, the light sensitivity characteristic of the first pixels P3 has sensitivity in a band close to a portion having sensitivity in the light sensitivity characteristic of the second pixels P2. The light sensitivity characteristic of the second pixel P2 has a local maximum value at the infrared wavelength. On the other hand, the light sensitivity characteristic of the first pixels P3 has not a local maximum value but a maximum value at a wavelength shorter than that at which the light sensitivity characteristic of the second pixels P2 has a local maximum value. In a band from the second wavelength λ2 to a predetermined wavelength longer than the second wavelength λ2 (at an arbitrary wavelength in the band), the light sensitivity of the first pixels P3 and that of the second pixels P2 are almost equal to each other. Note that "almost equal" means that the difference between the light sensitivity of the first pixels P3 and that of the second pixels P2 falls within a range of 10% of the light sensitivity of the first pixels P3 at an arbitrary wavelength. The predetermined wavelength can be a wavelength at which the first pixels P3 have sensitivity of 30% of the light sensitivity of the first pixels P3 at the second wavelength λ2.

For example, the image sensing unit described in the third embodiment can be formed as follows. First, the identical visible light cut filters for cutting visible light are provided in the first pixels P3 and second pixels P2. With this arrangement, in the wavelength characteristics of all the pixels, a wavelength shorter than the red wavelength of visible light is cut off. Furthermore, in only the second pixels P2, a filter having a characteristic in which a wavelength shorter than the infrared wavelength λ2 is cut off is provided for each pixel in, for example, a color filter forming step. A method of forming pixel groups having two different infrared bands in the surface of one image sensing unit can be readily implemented in an existing semiconductor process of creating a CCD or CMOS image sensor, and can form pixel groups at low cost. In a band longer than the wavelength λ2, the light sensitivity characteristics of the pixel groups are almost equal to each other. Consequently, when calculating the difference between images A and B, the calculation can be simplified by, for example, performing a simple subtraction operation without standardization or the like, and a calculation error due to additional calculation is reduced, thereby improving the detection accuracy. Particularly, since fluorescence is weak, it is effective at separating it from the background light. The image sensing unit or imaging device according to the third embodiment can be manufactured at low cost, and calculation of an output signal is easy, thereby improving the detection accuracy.

The third embodiment is also applicable to an image sensing unit including pixels R, B, and G having sensitivity in the visible light bands of red, blue, and green in addition to the second pixels P2 having sensitivity in the near-infrared band and exemplified in the second embodiment. For example, an image sensing unit can be configured so that the band of the R pixels from the red wavelength to the near-infrared wavelength has a characteristic including a portion indicating a local maximum value in the light sensitivity characteristic of the second pixels P2, and the light sensitivity characteristic of the second pixels P2 has a maximum value at a wavelength shorter than that at which the local maximum value is indicated. In such image sensing unit as well, it is possible to obtain the above-described effects, and acquire a color image of an object together with a vascular image in the near-infrared band.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-062729, filed Mar. 25, 2014, and 2014-265778 filed Dec. 26, 2014, which are hereby incorporated by reference herein in their entirety.

What is claimed is:

1. An imaging device comprising an image sensing unit having a plurality of pixels two-dimensionally arranged;
   the plurality of pixels including a first pixel and a second pixel;
   light sensitivity of the first pixel having a local maximum value or a maximum value at a first wavelength, a local maximum value at a second wavelength, and a local minimum value at a wavelength between the first wavelength and the second wavelength, the first wavelength being shorter than the second wavelength and the local maximum value or the maximum value at the first wavelength being more than the local maximum value at the second wavelength; and
   light sensitivity of the second pixel having a local maximum value at a third wavelength, the local maximum value at the third wavelength being higher than the local minimum value, the third wavelength being equal to the second wavelength or being nearer to the second wavelength than to the first wavelength, wherein
   the first wavelength is shorter than 800 nm, and the second wavelength and the third wavelength are both longer than 720 nm and shorter than 850 nm, the first, second and third wavelengths all being in a near-infrared wavelength band, and
   the value of the light sensitivity of the second pixel at the first wavelength is not higher than 10% of the value of the light sensitivity of the first pixel at the first wavelength.

2. The device according to claim 1, wherein the light sensitivity of the second pixel has no local maximum value at the first wavelength.

3. The device according to claim 1, wherein the plurality of pixels include a plurality of first pixels and a plurality of second pixels,
   the imaging device includes an image generating unit configured to generate a first image and a second image,
   the first image is generated using signals of the plurality of first pixels, and
   the second image is generated using signals of the plurality of second pixels.

4. The device according to claim 3, wherein the plurality of first pixels and the plurality of second pixels receive near-infrared light from an object which includes a first portion having a local maximum value of absorbance at the first wavelength and a second portion having a local maximum value of absorbance at the second wavelength,
   the first pixel and the second pixel are arranged to be adjacent to each other, and
   the image generating unit detects at least one of the first portion and the second portion of the object based on a ratio of signal values of the first pixel and the second pixel which are adjacent to each other.

5. The device according to claim 3, further comprising an analyzing unit configured to analyze a temporal change of at least one of the first image and the second image which are generated by the image generating unit.

6. The device according to claim 4, wherein the first portion indicates an artery and the second portion indicates a vein.

7. The device according to claim 4, wherein the first portion indicates an artery and the second portion indicates a vein, and
   the imaging device further comprises an analyzing unit configured to detect pulsation based on a temporal change of the first image generated by the image generating unit.

8. The device according to claim 1, further comprising a removing unit configured to remove background light entering the image sensing unit.

9. The device according to claim 1, further comprising a removing unit configured to remove a background light component by obtaining a difference between an image obtained by the image sensing unit in a state in which a light source configured to emit near-infrared light is ON and an image obtained by the image sensing unit in a state in which the light source is OFF.

10. The device according to claim 1, wherein the second pixel is configured to have no sensitivity to light of a wavelength not longer than a fourth wavelength within a range of 770 to 830 nm.

11. The device according to claim 1, wherein the first wavelength is shorter than the third wavelength, and
    the light sensitivity of the first pixel at the first wavelength is higher than the light sensitivity of the first pixel at the second wavelength.

12. The device according to claim 1, wherein the light sensitivity of the second pixel at the second wavelength is higher than a light sensitivity of the second pixel to blue.

13. The device according to claim 1, wherein the plurality of pixels further include a third pixel having highest sensitivity to blue among the plurality of pixels, and
    a light sensitivity of the second pixel to blue is lower than the light sensitivity of the third pixel to blue.

14. The device according to claim 13, wherein the first wavelength is shorter than 750 nm, and
    the second wavelength and the third wavelength are both longer than 750 nm.

15. The device according to claim 13, wherein the plurality of pixels further include a fourth pixel, the first pixel is a pixel having sensitivity to red, and the fourth pixel is a pixel having sensitivity to green.

16. The device according to claim 15, wherein the plurality of pixels are configured to acquire a color image by the first pixel, the third pixel, and the fourth pixel.

17. The device according to claim 16, wherein the second pixel and the third pixel each have a wavelength filter,
- the wavelength filter of the second pixel transmits a near-infrared of a predetermined wavelength, and
- the wavelength filter of the third pixel transmits the predetermined wavelength.

* * * * *